(12) United States Patent
Samejima et al.

(10) Patent No.: US 12,490,941 B2
(45) Date of Patent: Dec. 9, 2025

(54) ELECTROCARDIOGRAPHIC WAVEFORM MEASUREMENT DEVICE, INFORMATION MANAGEMENT SYSTEM, ELECTROCARDIOGRAPHIC WAVEFORM MEASUREMENT DEVICE CONTROL METHOD, AND NON-TRANSITORY RECORDING MEDIUM INCLUDING PROGRAM RECORDED THEREIN

(71) Applicant: OMRON HEALTHCARE Co., Ltd., Kyoto (JP)

(72) Inventors: Mitsuru Samejima, Kyoto (JP); Shinya Kodaka, Kyoto (JP); Hideaki Yoshida, Kyoto (JP); Daiki Adachi, Kyoto (JP); Kosuke Inoue, Kyoto (JP)

(73) Assignee: OMRON HEALTHCARE Co., Ltd., Kyoto (JP)

( * ) Notice: Subject to any disclaimer, the term of this patent is extended or adjusted under 35 U.S.C. 154(b) by 467 days.

(21) Appl. No.: 17/804,892

(22) Filed: Jun. 1, 2022

(65) Prior Publication Data

US 2022/0354435 A1 Nov. 10, 2022

Related U.S. Application Data

(63) Continuation of application No. PCT/JP2020/045630, filed on Dec. 8, 2020.

(30) Foreign Application Priority Data

Dec. 12, 2019 (JP) .................................. 2019-224284

(51) Int. Cl.
*A61B 5/318* (2021.01)
*A61B 5/00* (2006.01)
(Continued)

(52) U.S. Cl.
CPC ............ *A61B 5/7264* (2013.01); *A61B 5/282* (2021.01); *A61B 5/332* (2021.01); *A61B 5/6823* (2013.01)

(58) Field of Classification Search
CPC ....... A61B 5/7264; A61B 5/332; A61B 5/282; A61B 5/6823
See application file for complete search history.

(56) References Cited

U.S. PATENT DOCUMENTS 3,283,181 A * 11/1966 Johanson ................ H04R 17/02
600/407
8,738,118 B2 * 5/2014 Moon ...................... A61B 5/33
600/513
(Continued)

FOREIGN PATENT DOCUMENTS

CN 107530004 A 1/2019
CN 109893122 A 6/2019
(Continued)

OTHER PUBLICATIONS

International Search Report for International Application No. PCT/JP2020/045630, Dated Feb. 16, 2021.
(Continued)

*Primary Examiner* — Eric D. Bertram
(74) *Attorney, Agent, or Firm* — Colson Law Group, PLLC (57) ABSTRACT

An electrocardiographic waveform measurement device includes a plurality of electrodes configured to measure an electrocardiographic waveform of a measurement target, a vibration detection unit configured to approach a chest region of the measurement target to detect vibration based on a beat of a heart of the measurement target, and a control unit configured to execute measurement processing for the electrocardiographic waveform. The control unit further executes lead type determination processing for determin-
(Continued)

ing, based on a detection result from the vibration detection unit, at least whether the electrocardiographic waveform measured by the measurement processing is an electrocardiographic waveform obtained by chest lead measurement.

7 Claims, 10 Drawing Sheets

(51) Int. Cl.
   *A61B 5/282* (2021.01)
   *A61B 5/332* (2021.01)

(56) References Cited

U.S. PATENT DOCUMENTS

| | | | |
|---|---|---|---|
| 2015/0265217 A1* | 9/2015 | Penders | A61B 5/33 600/300 |
| 2017/0273584 A1* | 9/2017 | Huang | A61B 5/259 |
| 2018/0042502 A1* | 2/2018 | Wang | A61B 5/6823 |

FOREIGN PATENT DOCUMENTS

| | | |
|---|---|---|
| JP | 2002-51997 A | 2/2002 |
| JP | 2005-000468 A | 1/2005 |
| JP | 2014-128455 A | 7/2014 |
| JP | 2014-223184 A | 12/2014 |

OTHER PUBLICATIONS

Office Action issued on Sep. 11, 2024 in corresponding CN patent application No. 202080078132.X.

\* cited by examiner

ELECTROCARDIOGRAPHIC WAVEFORM MEASUREMENT DEVICE, INFORMATION MANAGEMENT SYSTEM, ELECTROCARDIOGRAPHIC WAVEFORM MEASUREMENT DEVICE CONTROL METHOD, AND NON-TRANSITORY RECORDING MEDIUM INCLUDING PROGRAM RECORDED THEREIN

TECHNICAL FIELD

The present invention belongs to a technical field related to healthcare, and particularly relates to an electrocardiographic waveform measurement device, an information management system, a control method for the electrocardiographic waveform measurement device, and a program.

BACKGROUND ART

In recent years, health management has been becoming more and more common in which information related to individual bodies and health (hereinafter also referred to as "biological information") such as a blood pressure value and an electrocardiographic waveform is measured using a measurement device, with measurement results recorded and analyzed by an information processing terminal.

As an example of a measurement device as described above, a portable electrocardiographic measurement device has been proposed that measures, in everyday life, an electrocardiographic waveform immediately when an abnormality such as chest pain or palpitation occurs, and the portable electrocardiographic measurement device is expected to contribute to early detection and appropriate treatment of a heart disease (e.g., Patent Document 1).

In the measurement of the electrocardiographic waveform, the resulting electrocardiographic waveform data varies with different lead types corresponding to positions with which a measurement electrode is brought into contact, and when the electrocardiographic waveform is analyzed and utilized, the accuracy of analysis can be improved by also using information indicating which lead type is used to measure the electrocardiographic waveform. In other words, the measurement of the electrocardiographic waveform needs not only the electrocardiographic waveform data but also acquisition of information indicating which lead type is used for the measurement. Note that the lead types can be roughly divided into a set of chest leads and a set of limb leads and that simply determining which of the set of chest leads and the set of limb leads is used to measure the electrocardiographic waveform deserves useful information.

CITATION LIST

Patent Literature

Patent Document 1: JP 2005-468 A

SUMMARY OF INVENTION

Technical Problem

Patent Document 1 describes a portable electrocardiographic measurement device including a body that includes a sensor unit, a control processing unit, an input unit, a display unit, and a timer unit, the identical body performing the measurement of the electrocardiographic waveform, as well as display of information indicating that measurement is in execution, display of an analysis result, storage of results, and the like. A technology has been proposed in which when the electrocardiographic waveform is measured, the orientation (arrangement) of display of information displayed on the display unit can be changed according to the position in which the electrode is in contact (according to the lead type). In other words, Patent Document 1 discloses that the information of the lead type is used to switch the orientation of the display on the display unit.

However, in the technology disclosed in Patent Document 1, the user needs to manually set the lead types for measurement, and this is cumbersome and prevents exclusion of the possibility that the set lead types are different from the lead types used during the actual measurement. Note that the document indicates that the device may include a function of automatically detecting a measurement method, but discloses no specific solution for this purpose.

In view of the related technology described above, an object of the present invention is to provide a technology enabling an electrocardiographic waveform measurement device to accurately determine at least whether the data of the electrocardiographic waveform acquired is an electrocardiographic waveform acquired by chest lead measurement.

Solution to Problem

In order to solve the problem described above, an electrocardiographic waveform measurement device according to an aspect of the present invention includes a plurality of electrodes configured to measure an electrocardiographic waveform of a measurement target, a vibration detection unit configured to approach a chest region of the measurement target to detect vibration based on a beat of a heart of the measurement target, and a control unit configured to execute measurement processing for the electrocardiographic waveform. The control unit further executes lead type determination processing for determining, based on a detection result from the vibration detection unit, at least whether the electrocardiographic waveform measured by the measurement processing is an electrocardiographic waveform obtained by chest lead measurement.

Here, the "vibration based on a beat of a heart" includes vibration of air, that is, heart sounds. In such a configuration, when the electrocardiographic waveform is measured, information as to whether the lead type is the chest lead can be accurately acquired depending on whether the vibration is detected (and the degree of the vibration). In a case where the lead type is a chest lead, the vibration based on the beat of the heart can be detected. In a case where limb leads are used for the measurement, the vibration fails to be detected (or the detected vibration is faint).

Additionally, the lead type determination processing may include determining whether the lead type is a lead V4 or a lead I. In addition, in the lead type determination processing, the control unit may determine that the lead type is the lead V4 in a case where the vibration detected by the vibration detection unit exceeds a predetermined threshold, and may determine that the lead type is the lead I in a case where the vibration is equal to or less than the predetermined threshold. For example, a threshold can be set based on the position of the crest of the wave of the vibration detected.

Additionally, the vibration detection unit may also include a microphone and a microphone accommodation space, and may be disposed near one of the plurality of electrodes. This may allow the heart sounds to be detected.

Additionally, the electrocardiographic waveform measurement device may further include an output unit configured to output at least a determination result of the lead type determination processing. In such a configuration, the user can appropriately reference the lead type used to measure the electrocardiographic waveform.

In addition, the electrocardiographic waveform measurement device may further include a storage unit and a lead type setting unit configured to register at least one lead type desired by the user in the storage unit as a user-set lead type. The control unit may be configured so that in a case where a determination result of the lead type determination processing is different from the user-set lead type, the control unit uses the output unit to output information indicating that determination result is different from the user-set lead type.

In such a configuration, for example, in a case where the user is instructed by a physician or the like to measure the electrocardiographic waveform using predetermined lead types, then by setting the lead types, the user can be prevented from making measurement erroneously using different lead types.

Additionally, the electrocardiographic waveform measurement device may include a storage unit in which at least the electrocardiographic waveform measured is saved, and the control unit may be configured to further execute analysis processing for analyzing the electrocardiographic waveform by referencing a determination result of the lead type determination processing and using an analysis parameter corresponding to the lead type for the electrocardiographic waveform measured.

The electrocardiographic waveform measurement device including the function of analyzing the electrocardiographic waveform is an already known technique. However, in such a device, the accuracy of the analysis can be increased by performing analysis using information as to which lead type is used for measurement leading to acquisition of the electrocardiographic waveform and using an analysis parameter corresponding to the lead type.

Additionally, the electrocardiographic waveform measurement device may be a portable electrocardiographic waveform measurement device.

Additionally, the electrocardiographic waveform measurement device may further include a communication unit configured to communicate with an information processing terminal, and the control unit may be configured to transmit at least data of the electrocardiographic waveform measured, to the information processing terminal via the communication unit. By communicatively connecting to the information processing terminal and utilizing data, convenience of the electrocardiographic waveform measurement device can be improved in browsing, analysis, utilization, or the like of the data.

Additionally, an information management system according to an aspect of the present invention includes the electrocardiographic waveform measurement device including a communication unit, and an information processing terminal including a communication unit configured to communicate with the electrocardiographic waveform measurement device.

In addition, a control method according to an aspect of the present invention is a control method for an electrocardiographic waveform measurement device including a vibration detection unit configured to approach a chest region of a measurement target to detect vibration based on a beat of a heart of the measurement target. The method includes:

an electrocardiographic waveform measurement step of measuring an electrocardiographic waveform of the measurement target, a vibration detection step of detecting at least presence or absence of the vibration, and a lead type determination step of determining, based on information of the presence or absence of the vibration detected in the vibration detection step, at least whether the electrocardiographic waveform measured in the electrocardiographic waveform measurement step is an electrocardiographic waveform obtained by chest lead measurement.

Additionally, the method further includes an analysis step of analyzing the electrocardiographic waveform measured in the electrocardiographic waveform measurement step by referencing a determination result of the lead type determination step, and using an analysis parameter corresponding to a lead type for the electrocardiographic waveform measured.

Additionally, the electrocardiographic waveform measurement step and the vibration detection step may be executed in parallel. In such a method, efficient electrocardiographic measurement can be performed without requiring extra time for vibration detection.

Additionally, the vibration detection step and the lead type determination step may be executed before the electrocardiographic waveform measurement step, and in the electrocardiographic waveform measurement step, measurement processing may be executed based on the determination result of the lead type determination step. According to such a method, measurement can be performed using the measurement parameter corresponding to the lead type, allowing the accuracy of the measurement to be improved.

In addition, the present invention can be considered as a program for causing an electrocardiographic waveform measurement device to execute the above-described method, and a computer-readable recording medium including such a program recorded therein in a non-transitory manner.

Also, the configurations and processing operations described above can be combined with one another to constitute the present invention unless the combination leads to contradiction.

Advantageous Effects of Invention

The present invention enables the electrocardiographic waveform measurement device to accurately determine at least whether the data of the electrocardiographic waveform acquired is an electrocardiographic waveform acquired by chest lead measurement.

DESCRIPTION OF EMBODIMENTS

First Embodiment

Figures 1A, 1D:
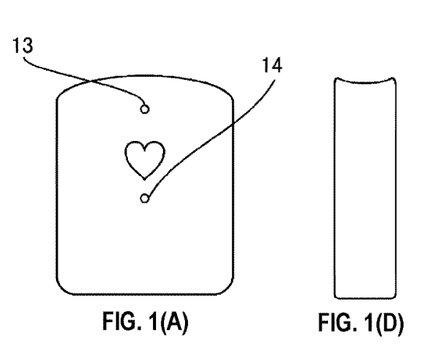
FIG. 1(A) is a front view illustrating a configuration of a portable electrocardiographic waveform measurement device according to an embodiment.
FIG. 1(D) is a right side view illustrating a configuration of the portable electrocardiographic waveform measurement device according to the embodiment.
Figure 1B:
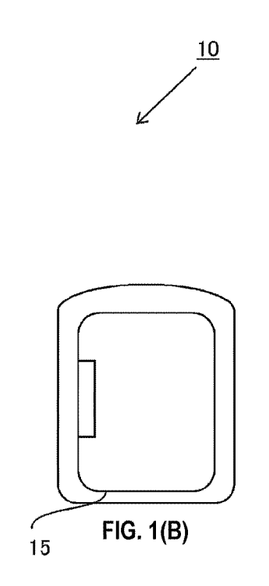
FIG. 1(B) is a rear view illustrating a configuration of a portable electrocardiographic waveform measurement device according to the embodiment.
Figure 1C:
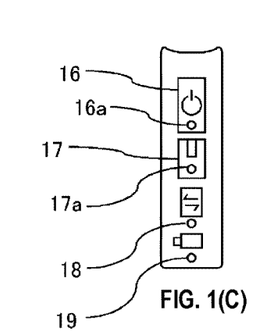
FIG. 1(C) is a left side view illustrating a configuration of the portable electrocardiographic waveform measurement device according to the embodiment.
Figure 1E:
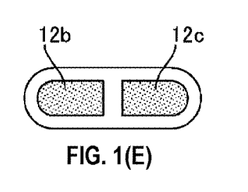
FIG. 1(E) is a plan view illustrating a configuration of the portable electrocardiographic waveform measurement device according to the embodiment.
Figure 1F:
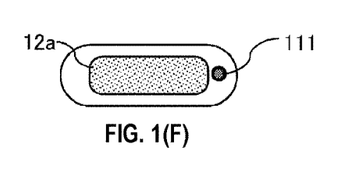
FIG. 1(F) is a bottom view illustrating a configuration of the portable electrocardiographic waveform measurement device according to the embodiment.

Embodiments of the present invention will be specifically described below with reference to the drawings. It should be noted that the dimension, material, shape, relative arrangement and the like of the components described in the present embodiment are not intended to limit the scope of this invention to them alone, unless otherwise stated.
Electrocardiographic Waveform Measurement Device FIGS. 1(A) through 1(F) are diagrams illustrating a configuration of a portable electrocardiograph 10 according to the present embodiment. FIG. 1(A) is a front view illustrating the front of the body. Similarly, FIG. 1(B) is a rear view, FIG. 1(C) is a left side view, FIG. 1(D) is a right side view, FIG. 1(E) is a plan view, and FIG. 1(F) is a bottom view.

Figure 2:
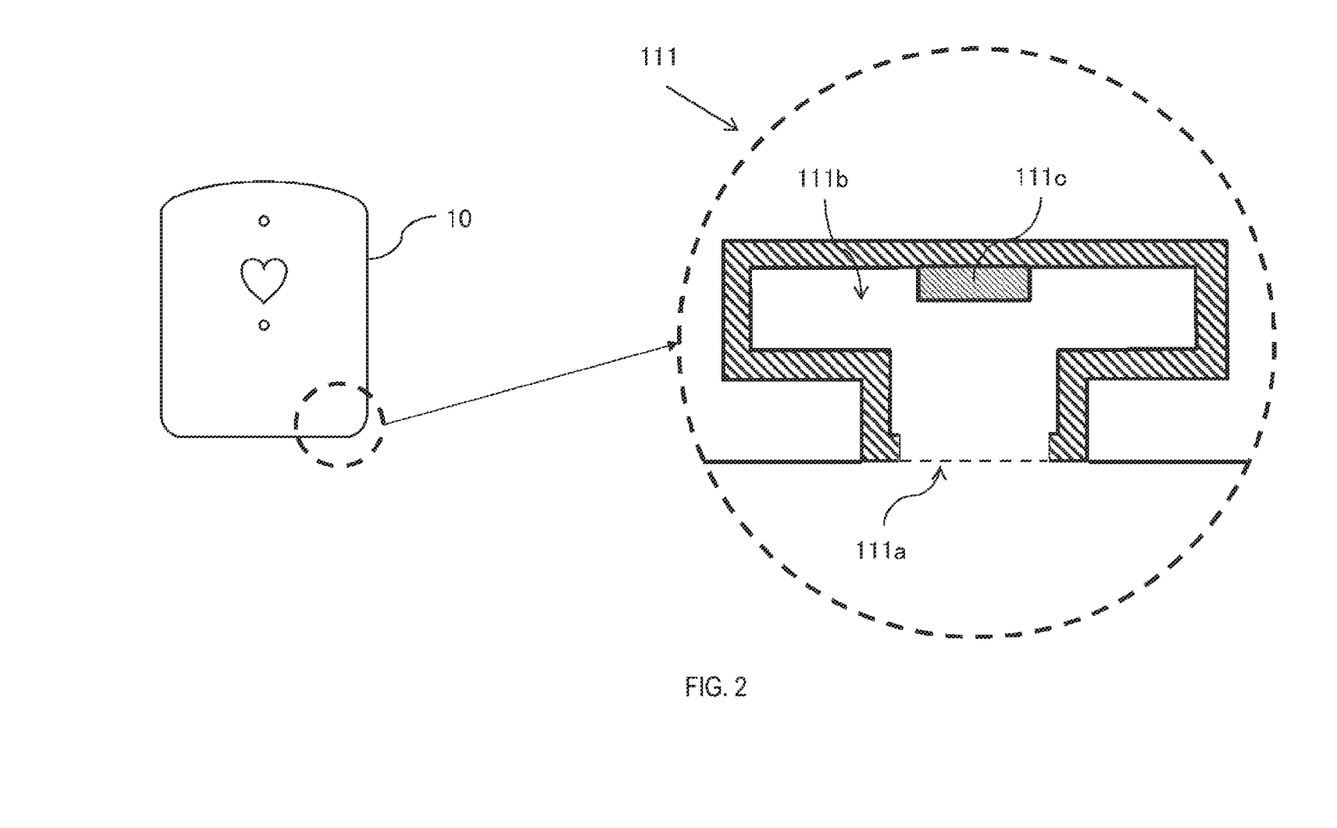
FIG. 2 is a partial cross-sectional view illustrating a structure of a vibration detection processing unit of the portable electrocardiographic waveform measurement device according to the embodiment.

A bottom surface of the portable electrocardiograph 10 is provided with a left electrode 12a brought into contact with the left side of the body during electrocardiographic measurement, and an opening of a vibration detection processing unit 111 is provided near the left electrode 12a, the vibration detection processing unit 111 detecting vibration based on the beat of the heart of a measurement target (hereinafter, simply referred to as the vibration). FIG. 2 is a partial cross-sectional view illustrating the structure of the vibration detection processing unit 111. The vibration detection processing unit 111 includes a microphone opening 111a that opens in a meshed shape toward the bottom surface side of the portable electrocardiograph 10, and a microphone 111c disposed at a position facing the microphone opening 111a, and a microphone space 111b in which the microphone 111c is accommodated. In a case where measurement is performed using the chest leads, the left electrode 12a is brought into contact with the chest. In this case, heart sounds (i.e., vibration) based on the heart beat are detected by the microphone 111c disposed near the left electrode 12a.

Additionally, a top surface side of the portable electrocardiograph 10 is provided with a first right electrode 12b with which the center of the right-hand index finger is brought into contact during electrocardiographic measurement and a second right electrode 12c with which the base of the right-hand index finger is brought into contact during electrocardiographic measurement. Note that the first right electrode 12b functions as a GND electrode.

During electrocardiographic measurement, the portable electrocardiograph 10 is held by the right hand, and the right-hand index finger is placed on the top surface portion of the portable electrocardiograph 10 in proper contact with the first right electrode 12b and the second right electrode 12c. Furthermore, the left electrode 12a is then brought into contact with the skin at a location corresponding to a desired lead type. For example, when measurement is performed by the so-called lead I, the left electrode is brought into contact with the palm of the left hand, and when measurement is performed by the so-called V4 lead, the left electrode is brought into contact with the skin slightly to the left of the epigastric region of the left chest and below the papilla.

In addition, various operation units and indicators are disposed on a left side surface of the portable electrocardiograph 10. Specifically, the left side surface includes a measurement switch 16, a measurement mode LED 16a, a Bluetooth (trade name) low energy (BLE) communication button 17, a BLE communication LED 17a, an available memory display LED 18, a battery change LED 19, and the like.

Additionally, a measurement state notification LED 13, an analysis result notification LED 14, and the like are provided at the front surface of the portable electrocardiograph 10, and a battery housing opening and a battery cover 15 are arranged at the rear surface of the portable electrocardiograph 10.

Figure 3:
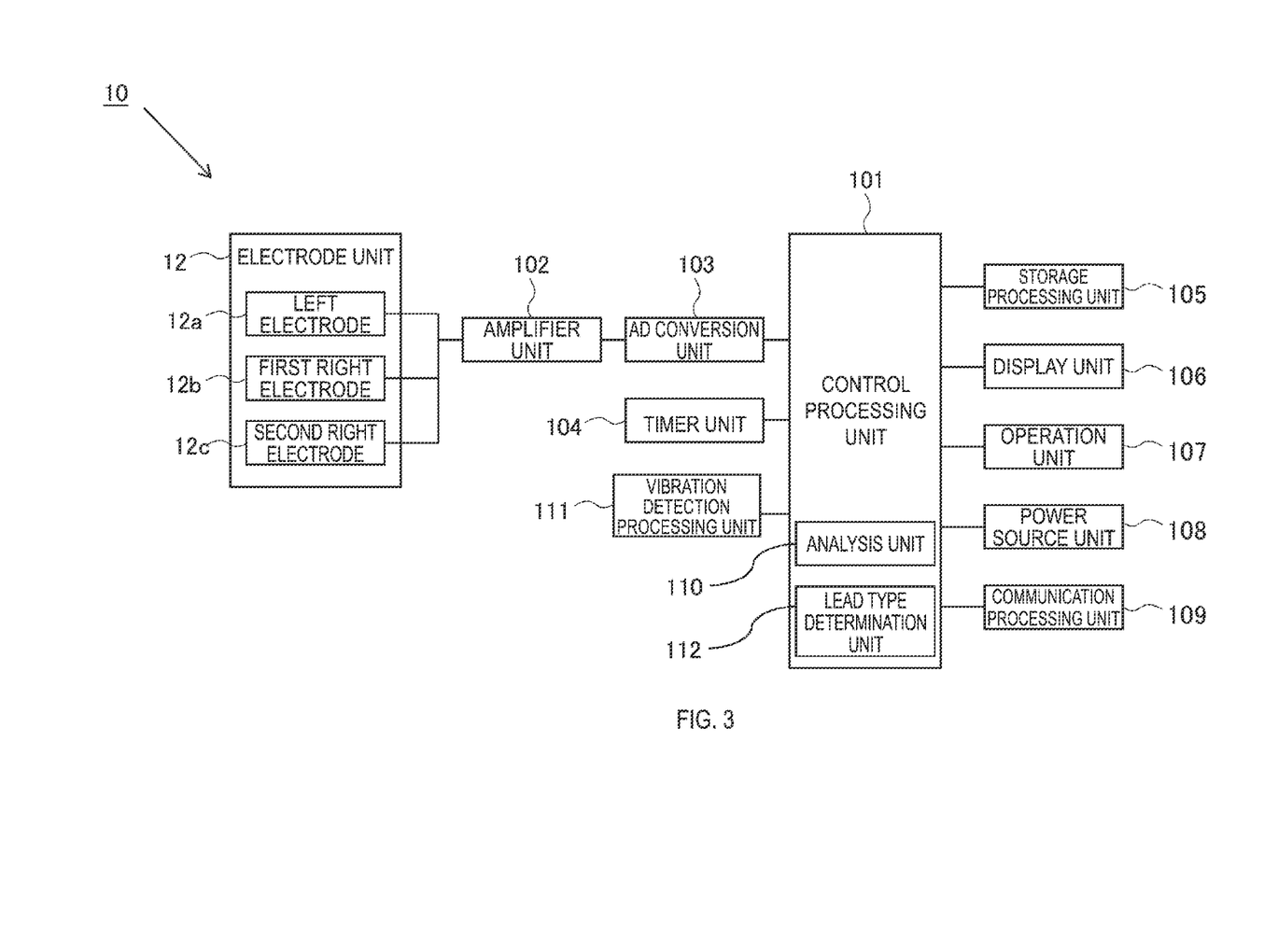
FIG. 3 is a block diagram illustrating a functional configuration of the portable electrocardiographic waveform measurement device according to the embodiment.

FIG. 3 illustrates a block diagram illustrating a functional configuration of the portable electrocardiograph 10. As illustrated in FIG. 3, the portable electrocardiograph 10 includes function units including a control processing unit 101, an electrode unit 12, an amplifier unit 102, an analog to digital (AD) conversion unit 103, a timer unit 104, a storage processing unit 105, a display unit 106, an operation unit 107, a power source unit 108, a communication processing unit 109, an analysis unit 110, a vibration detection processing unit 111, and a lead type determination unit 112.

The control processing unit 101 manages the control of the portable electrocardiograph 10, and includes a central processing unit (CPU) and the like, for example. In response to receiving operation of the user via the operation unit 107, the control processing unit 101 controls each component of the portable electrocardiograph 10 to execute various processing operations such as electrocardiographic measurement and information communication in accordance with a predetermined program. Note that the predetermined program is stored in the storage processing unit 105 described below.

Additionally, the control processing unit 101 includes, as a functional module, the analysis unit 110 analyzing electrocardiographic waveforms and the lead type determination unit 112. The analysis unit 110 analyzes the measured electrocardiographic waveform for the presence of disturbance or the like, and outputs a result indicating whether the electrocardiographic waveform obtained at least during measurement is normal. Based on the information of the vibration acquired by the vibration detection processing unit 111, the lead type determination unit 112 determines whether the measured electrocardiographic waveform is obtained using the lead V4 or the lead I, and outputs this information.

The electrode unit 12 includes the left electrode 12a, the first right electrode 12b, and the second right electrode 12c, and functions as a sensor for detecting an electrocardiographic waveform. The amplifier unit 102 functions to amplify signals output from the electrode unit 12. The AD conversion unit 103 functions to convert an analog signal amplified by the amplifier unit 102 into a digital signal and to transmit the converted signal to the control processing unit 101.

The timer unit 104 functions to measure time with reference to a real time clock (RTC, not illustrated). As described below, for example, the period of time until the end of measurement is counted and output during the electrocardiographic measurement.

The storage processing unit 105 includes a main memory (not illustrated) such as a random access memory (RAM) and stores various types of information such as application programs, measured electrocardiographic waveforms, and analysis results. In addition to the RAM, for example, a long-term storage medium such as a flash memory may be provided.

The display unit 106 includes light emitting elements such as the measurement mode LED 16a, the BLE communication LED 17a, the available memory LED 18, and the battery change LED 19 described above, and informs the user of the state of the device and the occurrence of an event by lighting, blinking, or the like of the LEDs. Additionally, the operation unit 107 includes the measurement switch 16, the communication button 17, and the like, and functions to receive an input operation from the user and to cause the control processing unit 101 to execute processing in accordance with the operation.

The power supply unit 108 includes a battery (not illustrated) that supplies power required for operation of the device. The battery may be, for example, a secondary battery such as a lithium ion battery, or a primary battery.

The communication processing unit 109 includes an antenna for wireless communication (not illustrated), and functions to communicate with another device such as an information processing terminal described below at least by BLE communication. Additionally, a terminal may be provided for wired communication.

The vibration detection processing unit 111 detects vibration in a case where the configuration described above is used to perform measurement using the chest leads.

Electrocardiographic Measurement Processing Using Portable Electrocardiograph

Figure 4:
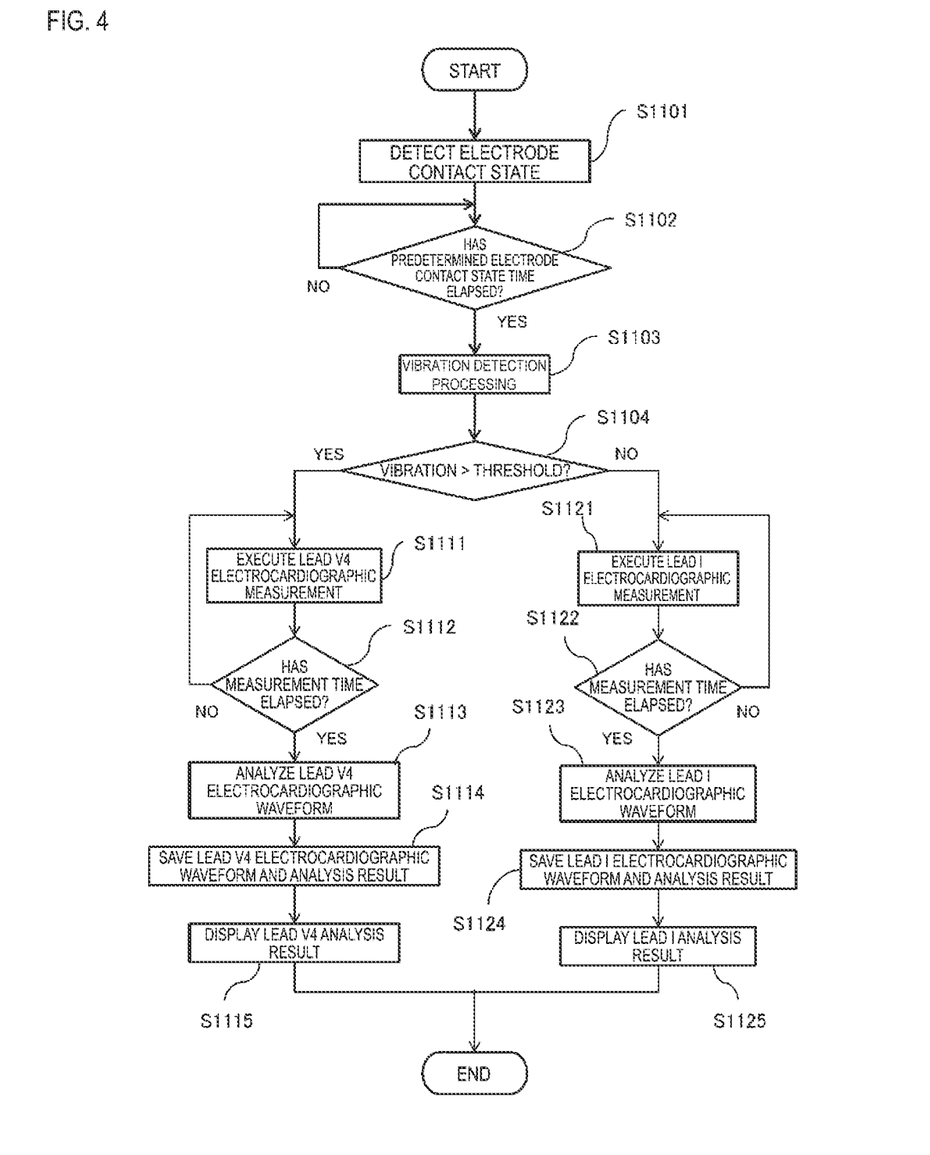
FIG. 4 is a flowchart illustrating a flow of electrocardiograph measurement processing in the portable electrocardiographic waveform measurement device according to the embodiment.

Now, based on FIG. 4, a description will be given for operation of the portable electrocardiograph 10 that is performed when the electrocardiographic measurement is performed. FIG. 4 is a flowchart illustrating a procedure of processing executed when electrocardiographic measurement is performed using the portable electrocardiograph 10 according to the present embodiment.

Before measurement of an electrocardiographic waveform, when the user presses the measurement switch 16 down, the device is powered on to execute a measurement mode, and the measurement mode LED is lighted to indicate that the measurement mode is in execution. With the measurement mode in execution, the user holds the portable electrocardiograph 10 in the right hand, with the right-hand index finger in contact with the first right electrode 12b and the second right electrode 12c, and with the left electrode 12a in contact with the skin at a location to be measured. Then, the control processing unit 101 detects a contact state via the electrode unit 12 (S1101), and executes a process of determining whether a predetermined time has elapsed with the electrode correctly in contact (S1102). Here, in response to determining that the predetermined time has not elapsed, the control processing unit 101 repeats the same processing until the predetermined time has elapsed, and in response to determining that the predetermined time has elapsed, the control processing unit 101 proceeds to step S1103. The control processing unit 101 executes processing for detecting vibration via the vibration detection processing unit 111 (S1103), and determines, via the lead type determination unit 112, whether the detected vibration exceeds a predetermined threshold (S1104). Here, in response to determining that the vibration exceeds the predetermined threshold, the control processing unit 101 assumes that the lead type is the lead V4, and executes lead V4 electrocardiographic measurement (S1111).

After step S1111, the control processing unit 101 executes processing for determining whether the predetermined electrocardiographic measurement time (for example, 30 seconds) has elapsed (step S1112). Here, in response to determining that the predetermined time has not elapsed, the control processing unit 101 returns to step S1111 and repeats the subsequent processing. On the other hand, in response to determining that the predetermined measurement time has elapsed, the control processing unit 101 ends the measurement, and executes, via the analysis unit 110, analysis processing for the electrocardiographic waveform (S1113). In accordance with the assumption that the lead type is the lead V4, the analysis processing is executed using an analysis parameter suitable for analysis of the electrocardiographic waveform data obtained by the lead V4 measurement.

When the analysis ends, the control processing unit 101 saves the electrocardiographic waveform data and an analysis result in the storage processing unit 105, along with information indicating that the data has been acquired by the lead V4 measurement (S1114). Then, the control processing unit 101 displays the analysis result by lighting (blinking) the analysis result notification LED 14 (S1115), and ends the series of measurement processing. When the analysis result is displayed as well, the display preferably enables the user to recognize, based on the color of the LED and/or the blinking pattern and/or the like, that the lead type used for the measurement is the lead V4.

On the other hand, in step S1104, in response to determining that the vibration is less than or equal to the threshold, the control processing unit 101 assumes that the lead type is the lead I, and executes lead I electrocardiographic measurement (S1121). In the lead I electrocardiographic measurement, as is the case with the lead V4, the control processing unit 101 executes processing for determining whether the predetermined electrocardiographic measurement time has elapsed (step S1122). Then, in response to determining that the predetermined time has not elapsed, the control processing unit 101 returns to step S1121 and repeats the subsequent processing. In response to determining that the predetermined measurement time has elapsed, the control processing unit 101 ends the measurement, and executes, via the analysis unit 110, the analysis processing for the electrocardiographic waveform (S1123). In accordance with the assumption that the lead type is the lead I, the analysis processing is executed using the analysis parameter suitable for the analysis of the electrocardiographic waveform data obtained by the lead I measurement.

When the analysis ends, the control processing unit 101 saves the electrocardiographic waveform data and the analysis result in the storage processing unit 105, along with information indicating that the data has been acquired by the lead I measurement (S1124). Then, the control processing unit 101 displays the analysis result by lighting (blinking) the analysis result notification LED 14 (S1125), and ends the series of measurement processing. When the analysis result is displayed as well, the display preferably enables the user to recognize, based on the color of the LED and/or the blinking pattern and/or the like, that the lead type used for the measurement is the lead I.

In the electrocardiographic waveform measurement device according to the present embodiment as described above, the information as to which of the lead V4 and the lead I is used to measure the electrocardiographic waveform is acquired before the electrocardiographic waveform measurement, and the information is used for measurement and analysis. Thus, parameters corresponding to each lead type are used for the measurement and analysis, enabling accurate results to be obtained. Additionally, the electrocardiographic waveform data is saved along with the information as to which lead type has been used to acquire the data, thus allowing an expert such as a physician to make efficient determination when the data is referenced later.

Second Embodiment

As in the first embodiment, the portable electrocardiograph 10 can singularly perform electrocardiographic waveform measurement, analysis of the measurement data, and display of the analysis result. However, by communicatively connecting the portable electrocardiograph 10 to the information processing terminal, the convenience of the portable electrocardiograph 10 can be further improved. Based on FIGS. 5 to 9, description will be given below for an embodiment of an information management system 1 including the portable electrocardiograph 10 and a smart phone 20 corresponding to an example of the information processing terminal.

Figure 5:
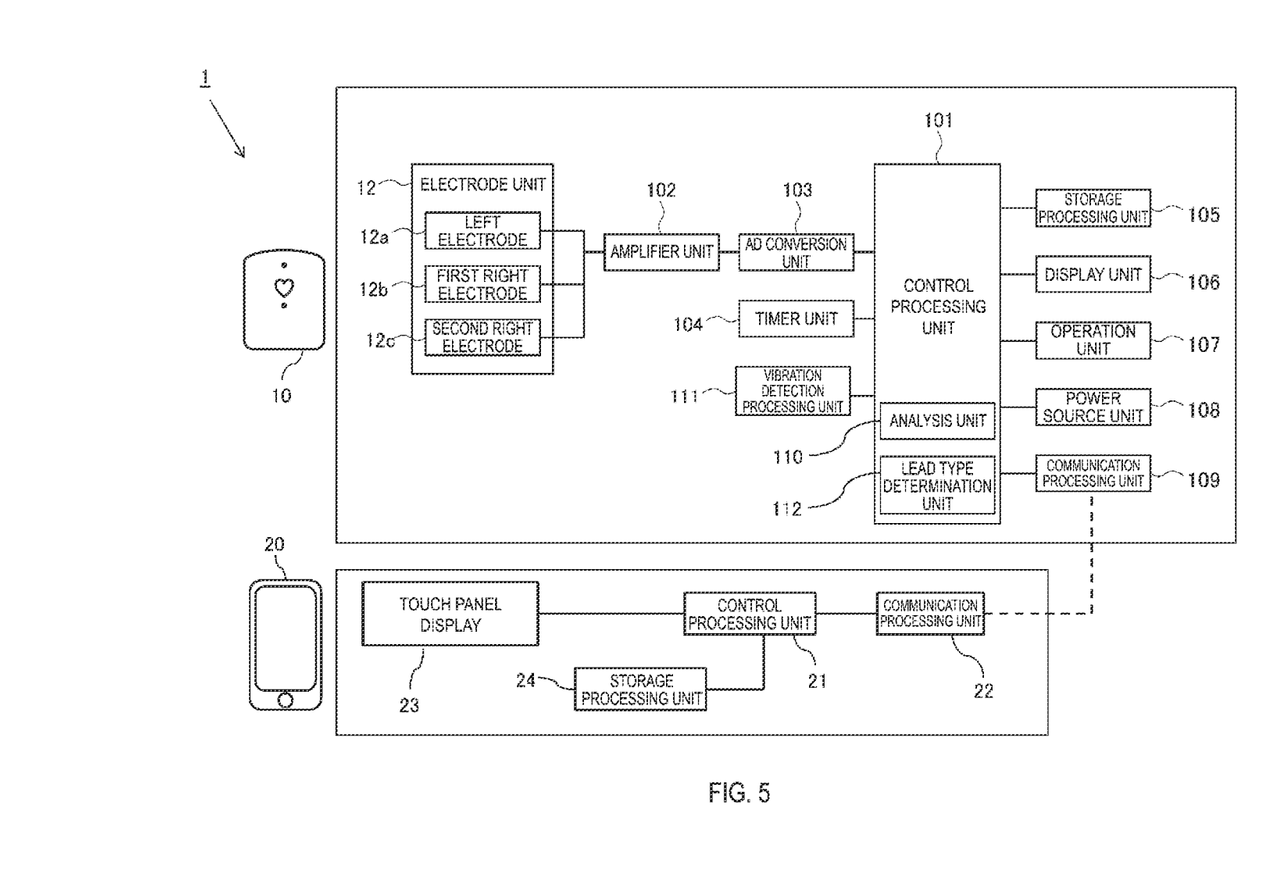
FIG. 5 is a block diagram illustrating an overview of an information management system according to an embodiment.

FIG. 5 is a schematic diagram illustrating a configuration example of the information management system 1 according to the present embodiment. As illustrated in FIG. 5, the information management system 1 includes the portable electrocardiograph 10 and the smart phone 20, which are communicatively connected with each other. Note that the portable electrocardiograph 10 is configured similarly to that described in the first embodiment, and will thus not be described.

Information Processing Terminal

As illustrated in FIG. 5, the smart phone 20, corresponding to an example of the information terminal, includes a control processing unit 21, a communication processing unit 22, a touch panel display 23, and a storage processing unit 24. The control processing unit 21 manages the control of the smart phone 20, and includes, for example, a CPU and the like. The control processing unit executes various programs stored in the storage processing unit 24 to fulfill functions corresponding to the programs. The communication processing unit 22 includes an antenna for wireless communication, and is a function of communicating with another device such as the portable electrocardiograph 10, and a wireless base station. Also, the communication processing unit 22 may include a terminal for wired communication.

The touch panel display 23 plays both a role of a display unit which is an aspect of an output unit, and a role of an input unit, and as described below, in a case where communicative connection to the portable electrocardiograph 10 is established, the touch panel display 23 can display status information such as the remaining time until the end of measurement, graph data of the electrocardiographic waveform, and the like. In addition, operations from the user are received via various input images.

The storage processing unit 24 includes, for example, a long-term storage medium such as a flash memory in addition to a main memory such as a RAM, and stores various information such as application programs, measurement electrocardiographic waveforms, and analysis results.

Figure 6:
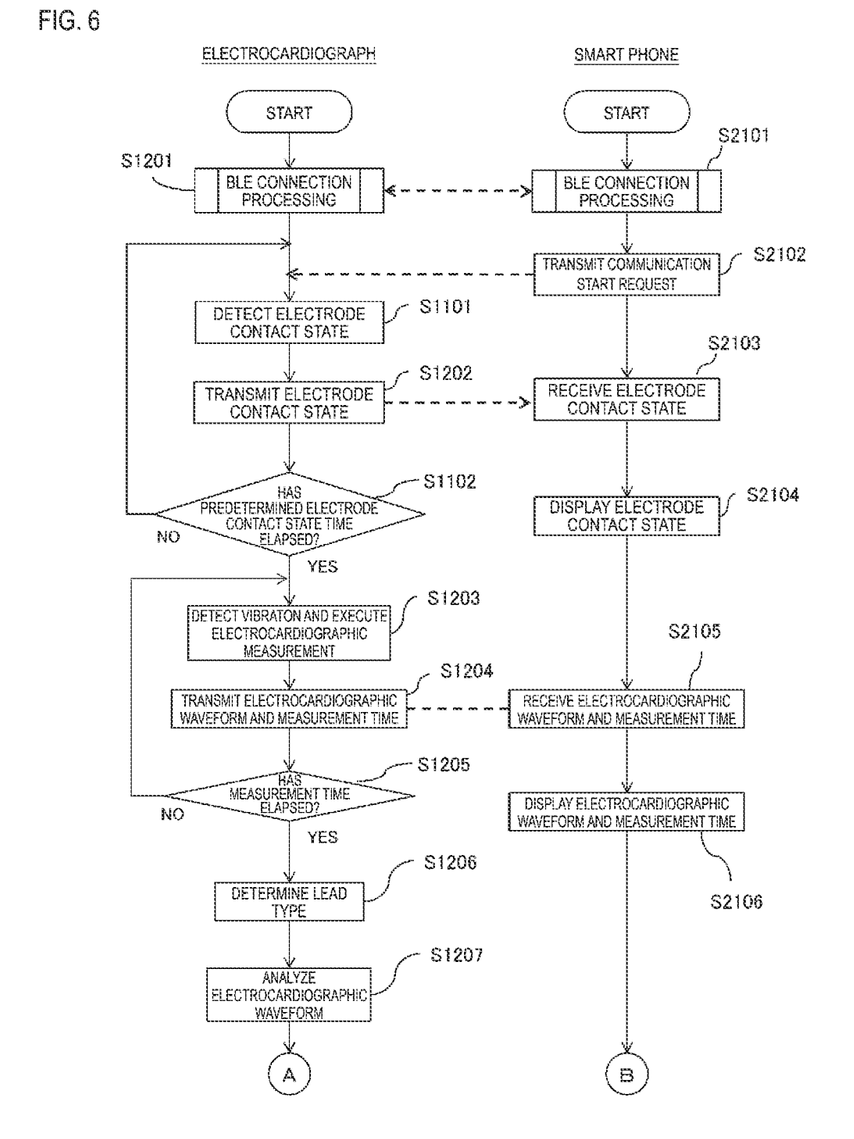
FIG. 6 is a first flowchart illustrating parts of processing flows of a portable electrocardiograph and a smart phone communicatively connected in the information management system according to the embodiment.
Figure 7:
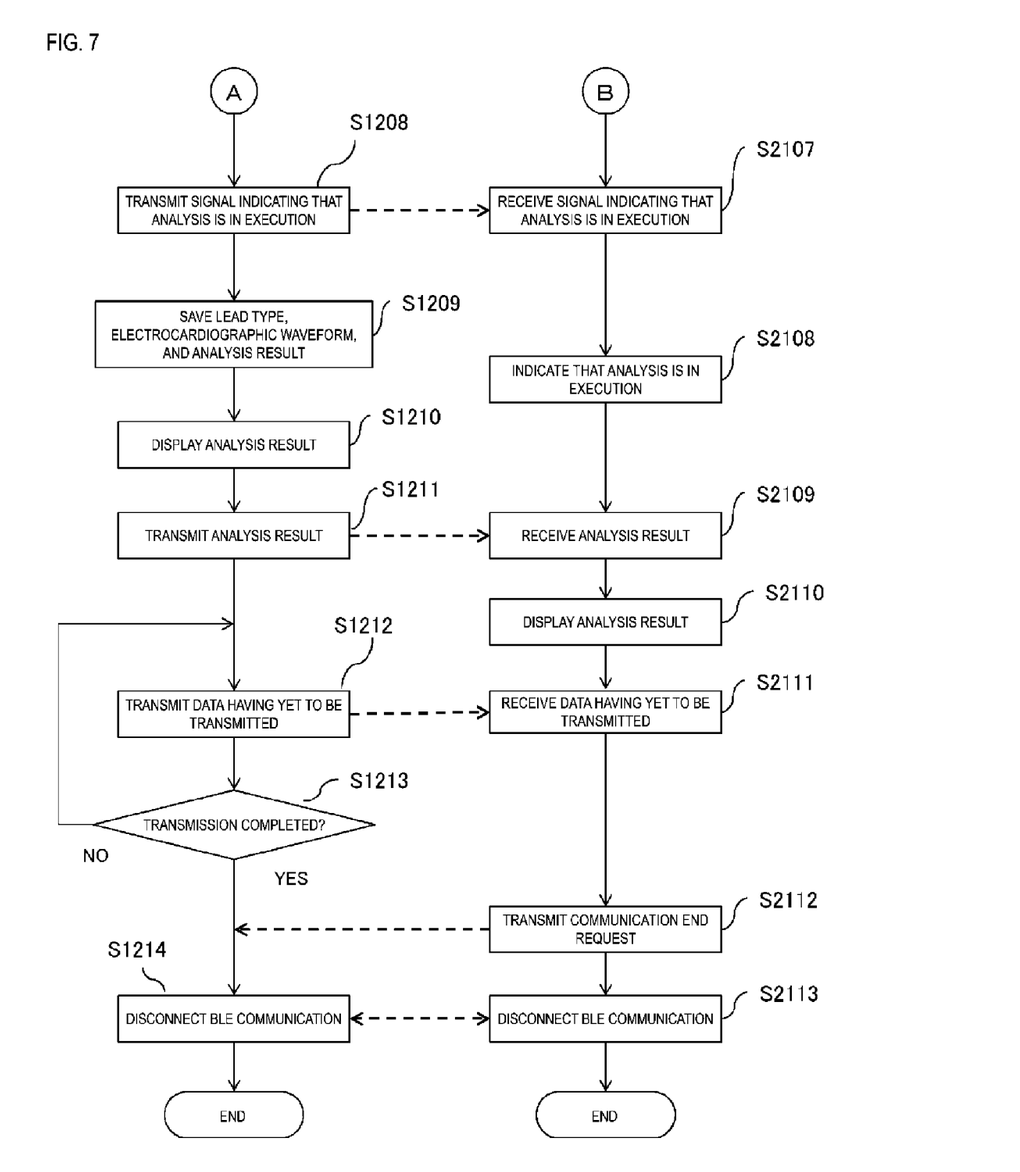
FIG. 7 is a second flowchart illustrating parts of the processing flows of the portable electrocardiograph and the smart phone communicatively connected in the information management system according to the embodiment.

Description will be given below based on FIGS. 6 to 9 for processing that is executed in a case where electrocardiographic measurement is performed by allowing the portable electrocardiograph 10 and the smart phone 20 to cooperate with each other through BLE communication. FIGS. 6 and 7 are diagrams illustrating a flow of processing of each of the portable electrocardiograph 10 and the smart phone 20 connected to each other through BLE communication and also illustrating timings for transmitting information between the devices. Note that for the flow of the processing of the portable electrocardiograph 10, the above-described processing operations are denoted by the same reference numerals, and the detailed description of the processing operations is omitted.

Figure 8:
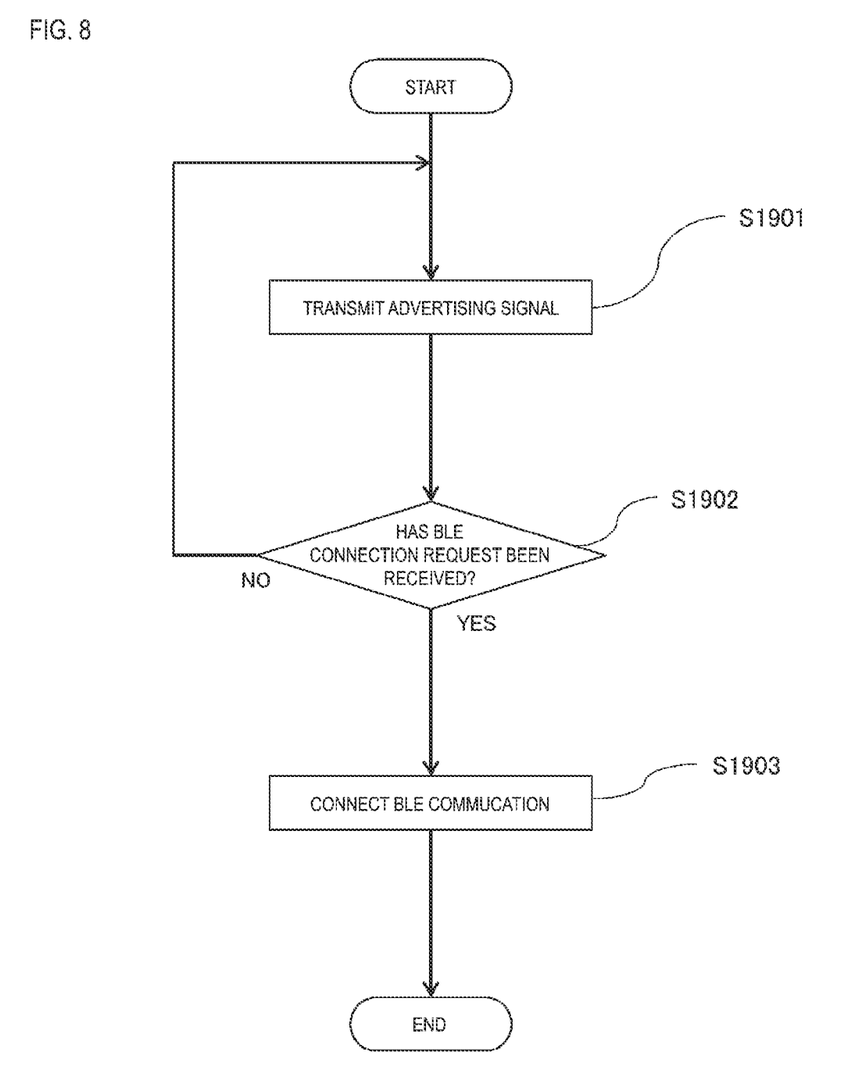
FIG. 8 is a flowchart illustrating a processing subroutine executed when BLE communication is performed by the portable electrocardiographic waveform measurement device according to the embodiment.

First, the user presses down the BLE communication button 17 of the portable electrocardiograph 10, and the control processing unit 101 executes the processing of the subroutine for BLE communication (S1201). FIG. 8 shows a flowchart of the subroutine. Specifically, as illustrated in FIG. 8, the control processing unit 101 first transmits an advertising signal for BLE communication from the communication processing unit 109 (S1901). Then, the control processing unit 101 determines whether a connection request for BLE communication has been received from the information processing terminal (S1902). Here, in response to determining that no connection request for BLE communication has been received, the control processing unit 101 repeats similar processing until the BLE communication processing is canceled due to the elapse of a predetermined time or operation of the operation unit 107. On the other hand, in response to determining that a connection request for BLE communication has been received, the control processing unit 101 proceeds to step S1903, and makes BLE connection to a device transmitting the connection request. When the BLE communication connection is established, the control processing unit 101 ends the subroutine.

Additionally, the user enables the smart phone 20 to make BLE communication with the portable electrocardiograph 10. Specifically, the user operates the touch panel display 23 to set the BLE connection settings to the ON state in a setting menu or the like. Alternatively, the BLE connection settings may be set to the ON state by initiating a dedicated application program for cooperation with the portable electrocardiograph 10.

Figure 9:
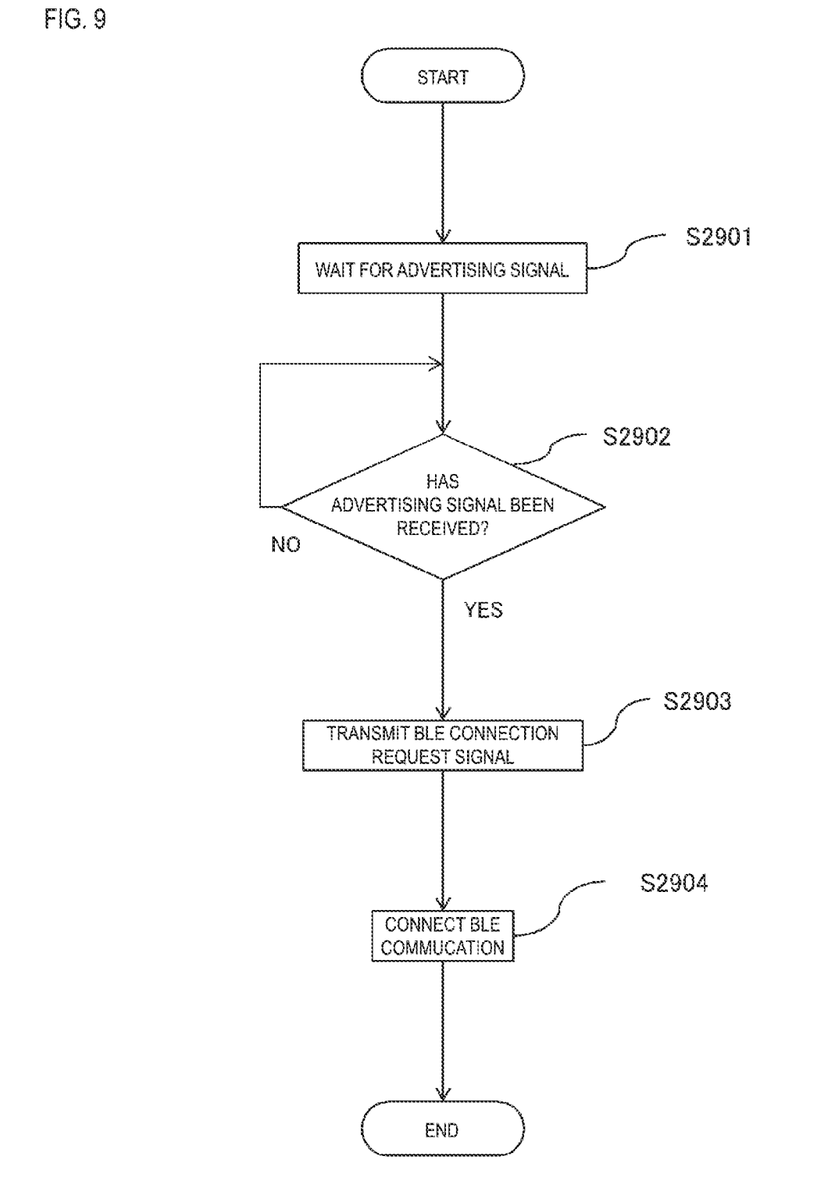
FIG. 9 is a flowchart illustrating a processing subroutine executed when BLE communication is performed by the information processing terminal according to the embodiment.

When the BLE connection settings are set to the ON state, the control processing unit 21 of the smart phone 20 executes the subroutine for BLE connection via the communication processing unit 22 (S2101). FIG. 9 illustrates the processing of the subroutine. Specifically, when the subroutine is initiated, the control processing unit 21 waits to receive the advertising signal from the portable electrocardiograph 10 (S2901). Then, the control processing unit 21 determines whether the advertisement signal has been received (S2902), and repeats the processing until the control processing unit 21 determines that the signal has been received. In response to determining in step S2092 that the advertising signal is received, the control processing unit 21 transmits a BLE connection request signal to the portable electrocardiograph 10 via the communication processing unit 22 (S2903). Then, the control processing unit 21 makes BLE connection to the portable electrocardiograph 10 (S2904. Corresponding to S1903 described above), and ends the subroutine. Then, in step S2102 in FIG. 6, the control processing unit 21 transmits a communication start request to the portable electrocardiograph 10.

On the other hand, the control processing unit 101 of the portable electrocardiograph 10 detects an electrode contact state (S1101), and then transmits information related to the electrode contact state to the smart phone 20 (S1202), and the smart phone 20 receives the information (S2103).

The smart phone 20, having received the information of the electrode contact state, displays the electrode contact state on the touch panel display 23 (S2104). The smart phone 20 may display, for example, the message "The electrodes are in proper contact", "The electrodes are not in proper contact", or the like.

After step S1202, the control processing unit 101 of the portable electrocardiograph 10 then executes processing for determining whether a predetermined time has elapsed with the electrodes in proper contact (S1102). Here, in response to determining that the predetermined time has not elapsed, then the control processing unit 101 returns to step S1101, and repeats the subsequent processing. In response to determining that the predetermined time has elapsed, the control processing unit 101 proceeds to step S1203. In step S1203, the electrocardiographic waveform measurement processing and the vibration detection processing are executed in parallel, and the electrocardiographic waveform data and the vibration data are sequentially saved in the storage processing unit 105. In other words, in the present embodiment, the detection of vibration and the determination of the lead type are not performed before the measurement of the electrocardiographic waveform.

The control processing unit 101 executes processing for transmitting to the smart phone 20 the data of the electrocardiographic waveform and the electrocardiographic measurement time (the remaining time until the end of the measurement) that are measured in step S1203 (S1204).

The data transmitted from the portable electrocardiograph 10 in step S1204 is received in the smart phone 20 (S2105), and the electrocardiographic measurement time and the electrocardiographic waveform graph are displayed on the touch panel display 23 (S2106). Specifically, the graph of the electrocardiographic waveform may be displayed along with, for example, the countdown message "XX seconds until the end of the electrocardiographic measurement".

Then, in step S1205, the control processing unit 101 of the portable electrocardiograph 10 determines whether a predetermined measurement time has elapsed, and in a case where the predetermined time has not elapsed, returns to step S1203 and repeats the subsequent processing. On the other hand, in a case where the control processing unit 101 determines in step S1205 that the predetermined measurement time has elapsed, the lead type determination unit 112 executes the determination processing for the lead type (S1206). The determination processing is performed based on the vibration data saved in the storage processing unit 105. The determination method itself is similar to that described in the first embodiment, and thus description of the method is omitted.

Then, the analysis unit 110 analyzes the detected electrocardiographic waveform by additionally using the information of the lead type determined in step S1206 (S1207). Then, while the analysis is in execution, the control processing unit 101 transmits, to the smart phone 20, information indicating that the analysis is in execution (S1208). When the analysis is ended, the control processing unit 101 saves the result of the analysis and the electrocardiographic waveform data and the lead type data in the storage processing unit 105 (S1209). Additionally, the control processing unit 101 displays the analysis result via the analysis result notification LED 14 (S1210), and transmits the analysis result information to the smart phone 20 (S1211). Note that for the display of the analysis result, for example, the LED may be lighted only in a case where the electrocardiographic waveform is found abnormal or may be lighted in accordance with a lighting and blinking method corresponding to the analysis result. Alternatively, the information of the lead type may be reflected in the display.

Figure 10A:
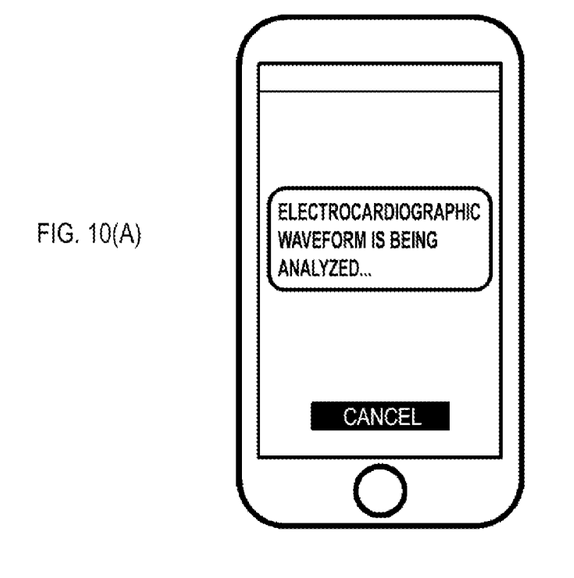
FIG. 10(A) is a diagram illustrating an example of a screen provided when electrocardiographic waveform analysis-in-progress display is performed on a smart phone according to an embodiment.
Figure 10B:
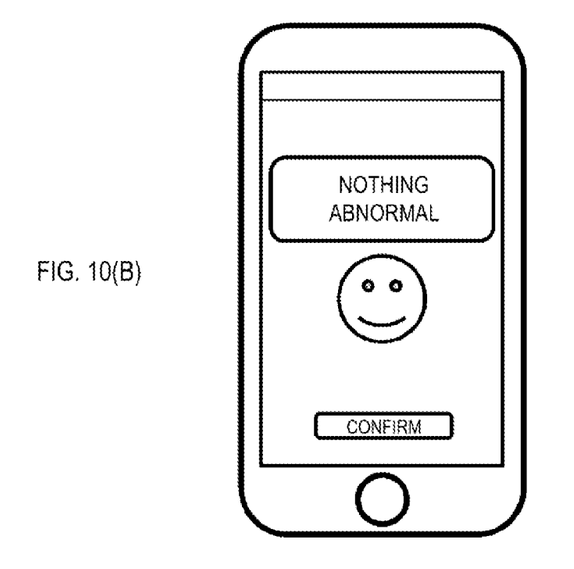
FIG. 10(B) is a diagram illustrating an example of a screen provided when electrocardiographic waveform analysis result display is performed on the smart phone according to the embodiment.

After step S2106, in response to receiving, via the communication processing unit 22, information indicating that the electrocardiographic waveform is being analyzed (S2107), the control processing unit 21 of the smart phone 20 displays the information on the touch panel display 23 (S2108). FIG. 10(A) illustrates an example of a screen displaying information indicating that the analysis is in execution. Then, in response to receiving, via the communication processing unit 22, the analysis result information transmitted from the portable electrocardiograph 10 (S2109), the control processing unit 21 causes the touch panel display 23 to display the result (S2110). FIG. 10(B) illustrates an example of a screen displaying the analysis result.

After step S1211, in a case where any data (electrocardiographic waveform, analysis result, lead type, or the like) has yet to be transmitted to the smart phone 20, the control processing unit 101 of the portable electrocardiograph 10 transmits the data to the smart phone 20 (S1212). Then, the control processing unit 101 determines whether all data has been transmitted (S1213). Here, in response to determining that not all of the data has been transmitted, then the control processing unit 101 returns to step S1212 and repeats the subsequent processing. On the other hand, in step S1213, in response to determining that all of the data transmission has been completed, the control processing unit 101 waits for a communication end request from the smart phone 20, and disconnects the BLE communication (S1214), to end the series of processing operations.

After step S2110, in a case where data having yet to be transmitted is transmitted from the portable electrocardiograph 10, the control processing unit 21 of the smart phone 20 receives the data (S2111), transmits, to the portable electrocardiograph 10, a signal requesting the termination of the communication (S2112), and deletes the BLE connection (S2113) to end the series of processing operations.

As is described above, the portable electrocardiograph 10 and the information management system 1 of the present embodiment can be used in cooperation with an information processing terminal such as the smart phone 20 to display various data such as electrocardiographic waveform data on the display for browsing. Additionally, the data received can be saved, and can be effectively utilized by using an application program or the like.

Additionally, instead of the detection of vibration and the determination of the lead type being performed before the measurement of the electrocardiographic waveform, the detection of vibration is performed in parallel with the measurement of the electrocardiographic waveform, thus allowing efficient measurement processing to be executed.

Other Points

The description of each example described above is merely illustrative of the present invention, and the present invention is not limited to the specific embodiments described above. Within the scope of the technical idea of the present invention, various modifications and combinations may be made.

For example, in the example described above, the electrocardiographic waveform measurement device is of the portable type, but the device for electrocardiographic waveform measurement need not be of the portable type. Also, the vibration detection unit for detecting vibration based on the beat of the heart is illustrated as the microphone, but is not necessarily limited to the microphone, and any other vibration sensor may be used.

The information processing terminal is not limited to a smart phone, and may be another portable information processing terminal such as a tablet terminal, or may be a stationary terminal. Additionally, the communication processing unit is not limited to a communication processing unit intended for BLE communication, and may be an antenna enabling other wireless communication such as Wi-Fi (trade name) or infrared communication. Alternatively, the communication processing unit may communicate using a wired connection.

REFERENCE NUMERALS LIST

1 Biological information management system
10 Portable electrocardiograph
12a Left electrode
12b First right electrode
12c Second right electrode
13 Measurement state notification LED
14 Analysis result notification LED
15 Battery cover
16 Measurement switch
16a Measurement mode LED
17 Communication button
17a BLE Communication LED
18 Available memory display LED
19 Battery change LED
111a Microphone opening portion
111b Microphone space
111c Microphone
20 Smart phone

The invention claimed is:

1. An electrocardiogra waveform measurement device comprising:
a plurality of electrodes configured to measure an electrocardiogramaveform of a measurement target;
a vibration detection unit configured to approach a chest region of the measurement target to detect vibration based on a beat of a heart of the measurement target;
a storage unit in which at least the electrocardiogramaveform measured is saved; and,
a control unit configured to execute measurement processing for the electrocardiogra waveform, wherein the control unit further executes lead type determination processing for determining, based on a detection result from the vibration detection unit, at least whether the electrocardiogramaveform measured by the measurement processing is an electrocardiogramaveform obtained by chest lead measurement, wherein the control unit further executes analysis processing for analyzing the electrocardiogramaveform by referencing a determination result of the lead type determination processing and using an analysis parameter corresponding to the lead type for the electrocardiogramaveform measured,
an output unit configured to output at least a determination result of the lead type determination processing, and
an operation unit, wherein:
the control unit registers at least one lead type desired by the user in the storage unit as a user-set lead type by receiving operation input via the operation unit, and uses the output unit to output information indicating that the determimation result is different from the user-set lead type in a case where a determination result of the lead type determination processing is different from the user-set lead type.

2. The electrocardiogramaveform measurement device according to claim 1, wherein the lead type determination processing includes determining whether the lead type is a lead V4 or a lead I.

3. The electrocardiogramaveform measurement device according to claim 2, wherein in the lead type determination processing, the control unit determines that the lead type is the lead V4 in a case where the vibration detected by the vibration detection unit exceeds a predetermined threshold, and determines that the lead type is the lead I in a case where the vibration is equal to or less than the predetermined threshold.

4. The electrocardiogramaveform measurement device according to claim 1, wherein the vibration detection unit includes a microphone and a microphone accommodation space, and is disposed near one of the plurality of electrodes.

5. The electrocardiogramaveform measurement device according to claim 1, wherein the electrocardiogramaveform measurement device is a portable electrocardiogra waveform measurement device.

6. The electrocardiogramaveform measurement device according to claim 1, further comprising a communication unit configured to communicate with an information processing terminal, wherein the control unit transmits at least data of the electrocardiogra waveform measured, to the information processing terminal via the communication unit.

7. An information management system comprising:
the electrocardiogramaveform measurement device according to claim 6; and,
an information processing terminal including a communication unit configured to communicate with the portable electrocardiogramaveform measurement device.

* * * * *